(12) United States Patent
Hirata et al.

(10) Patent No.: US 11,501,390 B2
(45) Date of Patent: Nov. 15, 2022

(54) ENERGY SAVING SUPPORT SYSTEM

(71) Applicant: TOYOTA JIDOSHA KABUSHIKI KAISHA, Toyota (JP)

(72) Inventors: Tetsuya Hirata, Nagoya (JP); Masayuki Kawamoto, Toyota (JP); Jun Koreishi, Toyota (JP); Tatsuya Morii, Nagoya (JP); Hiroaki Sugiyama, Nagoya (JP); Daisuke Takanohashi, Susono (JP); Koshi Ito, Okazaki (JP); Kengo Matsunaga, Toyota (JP); Takahiro Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/353,699

(22) Filed: Mar. 14, 2019

(65) Prior Publication Data

US 2019/0228485 A1    Jul. 25, 2019

Related U.S. Application Data

(63) Continuation of application No. 15/521,501, filed as application No. PCT/JP2015/078525 on Oct. 7, 2015, now Pat. No. 11,151,670.

(30) Foreign Application Priority Data

Oct. 23, 2014 (JP) ................................ 2014-216537

(51) Int. Cl.
*G06Q 50/16*  (2012.01)
*G06Q 50/06*  (2012.01)
(Continued)

(52) U.S. Cl.
CPC ....... *G06Q 50/163* (2013.01); *G06Q 30/0203* (2013.01); *G06Q 50/06* (2013.01);
(Continued)

(58) Field of Classification Search
CPC .. G06Q 50/163; G06Q 30/0203; G06Q 50/06; H02J 3/46; G02J 3/322; Y04S 10/123
See application file for complete search history.

(56) References Cited

U.S. PATENT DOCUMENTS 6,216,956 B1    4/2001   Ehlers et al.
6,603,218 B1    8/2003   Aisa
(Continued)

FOREIGN PATENT DOCUMENTS

JP    2009-187050 A    8/2009
JP    2010-176373 A    8/2010
(Continued)

OTHER PUBLICATIONS

Ahmad, Farugui and Sergici, Sanem and Sharif, Ahmed, The impact of informational feedback on energy consumption—A survey of the experimental evidence, 2010, Elsevier, Energy 35, pp. 1598-1608 (Year: 2010).*

(Continued)

*Primary Examiner* — Rutao Wu
*Assistant Examiner* — Stephen S Swartz
(74) *Attorney, Agent, or Firm* — Oliff PLC

(57) ABSTRACT

An energy saving support system according to an embodiment is configured to provide a consumer, who has an electric load to which electric energy is supplied from an electric power supply system within a house, with energy consumption-related information through a photo frame or the like. The information providing apparatus is configured to acquire an acceptability level, which stepwise indicates a degree of interest of the consumer in the energy consump- (Continued)

tion-related information, and to determine the energy consumption-related information to be newly provided to the consumer based on the acceptability level.

18 Claims, 10 Drawing Sheets

(51) Int. Cl.
| | |
|---|---|
| H02J 3/00 | (2006.01) |
| H02J 13/00 | (2006.01) |
| H02J 3/38 | (2006.01) |
| H02J 3/32 | (2006.01) |
| G06Q 30/02 | (2012.01) |
| H02J 3/46 | (2006.01) |

(52) U.S. Cl.
CPC ............. *H02J 3/003* (2020.01); *H02J 3/322* (2020.01); *H02J 3/38* (2013.01); *H02J 3/381* (2013.01); *H02J 3/46* (2013.01); *H02J 13/00006* (2020.01); *H02J 13/00007* (2020.01); *H02J 13/00034* (2020.01); H02J 2203/20 (2020.01); H02J 2300/24 (2020.01); Y02B 90/20 (2013.01); Y02E 10/56 (2013.01); Y02E 40/70 (2013.01); Y02E 60/00 (2013.01); Y02E 70/30 (2013.01); Y04S 10/123 (2013.01); Y04S 10/50 (2013.01); Y04S 20/12 (2013.01); Y04S 40/12 (2013.01); Y04S 40/20 (2013.01); Y04S 50/14 (2013.01)

(56) References Cited

U.S. PATENT DOCUMENTS

| | | | |
|---|---|---|---|
| 2004/0095237 A1 | 5/2004 | Chen et al. | |
| 2006/0259332 A1* | 11/2006 | Brown | B25F 5/00 705/3 |
| 2008/0090513 A1* | 4/2008 | Collins | H04H 60/65 455/3.01 |
| 2010/0076835 A1* | 3/2010 | Silverman | G06Q 10/06 705/14.33 |
| 2010/0106340 A1 | 4/2010 | Al-Mutawa | |
| 2010/0191487 A1 | 7/2010 | Rada et al. | |
| 2010/0211443 A1* | 8/2010 | Carrel | G06Q 30/0208 705/14.11 |
| 2011/0015802 A1* | 1/2011 | Imes | G05D 23/1923 700/300 |
| 2011/0022242 A1 | 1/2011 | Bukhin et al. | |
| 2011/0137763 A1 | 6/2011 | Aguilar | |
| 2011/0264291 A1* | 10/2011 | Le Roux | G06Q 10/06 700/291 |
| 2011/0289019 A1 | 11/2011 | Radloff et al. | |
| 2011/0296163 A1 | 12/2011 | Abernethy et al. | |
| 2012/0101653 A1* | 4/2012 | Tran | G01D 4/004 700/296 |
| 2012/0215369 A1* | 8/2012 | Desai | G06Q 50/06 700/291 |
| 2012/0296799 A1 | 11/2012 | Playfair et al. | |
| 2012/0330716 A1* | 12/2012 | Volpe | G06Q 30/0201 705/7.29 |
| 2013/0282624 A1* | 10/2013 | Schackmuth | G08B 21/182 340/657 |
| 2013/0345884 A1 | 12/2013 | Forbes, Jr. | |
| 2013/0345888 A1 | 12/2013 | Forbes, Jr. | |
| 2014/0114850 A1* | 4/2014 | Forbes, Jr. | G05D 17/00 705/40 |
| 2014/0114867 A1 | 4/2014 | Volkmann et al. | |
| 2014/0122104 A1* | 5/2014 | Van Halteren | G16H 40/67 705/2 |
| 2014/0277769 A1 | 9/2014 | Matsuoka et al. | |
| 2015/0012147 A1 | 1/2015 | Haghighat-Kashani et al. | |
| 2015/0039429 A1 | 2/2015 | Gelonese | |
| 2015/0066221 A1 | 3/2015 | Weaver et al. | |

FOREIGN PATENT DOCUMENTS

| | | |
|---|---|---|
| JP | 2010-218077 A | 9/2010 |
| JP | 2011-66956 A | 3/2011 |

OTHER PUBLICATIONS

Gronjoj, Alice and Thogersen, John, Feedback on household electricity consumption: learning and social influence processes, 2011, International Journal of Consumer Studies ISSN 1470-6423, pp. 142 (Year: 2011).*

Karjalainen, Sami, Consumer preferences for feedback on household electricity consumption, 2011, Energy and Building, vol. 43, pp. 458-467 (year 2011) (Year: 2011).*

Jul. 11, 2019 Office Action issued in U.S. Appl. No. 15/521,501.
Jan. 24, 2020 Office Action issued in U.S. Appl. No. 15/521,501.
Jul. 9, 2020 Office Action issued in U.S. Appl. No. 15/521,501.
Nov. 27, 2020 Office Action issued in U.S. Appl. No. 15/521,501.
Vassileva-Iana, Wallin-Fredrik, Dahlquist-Erik, Understanding energy consumption behavior for future demand response strategy development, 2012, Energy, 46, pp. 94-100 (Year 2012).
Apr. 20, 2021 Notice of Allowance issued in U.S. Appl. No. 15/521,501.

* cited by examiner (A)

COULD YOU PLEASE TELL US
YOUR CURRENT HOUSEHOLD SIZE,
if it is OK with you?

( 1 PERSON ) ( 2 PERSONS ) ( 3 PERSONS ) ( 4 PERSONS ) ( 5 PERSONS ) ( 6 PERSONS ) ( 7 OR MORE PERSONS )

(B)

COULD YOU PLEASE TELL US CONTRACT AMPERAGE OF
YOUR CURRENT ELECTRICITY CONTRACT PLAN,
if it is OK with you?

( 10A ) ( 20A ) ( 30A ) ( 40A ) ( 50A ) ( 60A ) ( OTHER )

FIG.3

| TOTALLY NEGATIVE OR DISAPPROVAL ANSWER | PASSIVE ANSWER | POSITIVE ANSWER |
|---|---|---|
| I DON'T NEED THIS INFORMATION | I'M NOT MUCH AWARE OF IT | IT WAS WORTH THE EFFORT |
| I WON'T TRY THIS ACTION | I THINK I CAN'T TRY ANY MORE | I'LL TRY HARDER |
| ⋮ | I DON'T CARE SO MUCH | I SEE! I'LL DO IT |
| | ⋮ | I'LL KEEP IT IN MIND! |
| | | TOO BAD. I KEPT IT IN MIND, THOUGH |
| | | ⋮ |

FIG.4

| AGENT (KIND OF RECOMMENDATION) | RECOMMENDATION | ACCUMULATION PERIOD | DWELLER ATTRIBUTE | REFERENCE VALUE | RESULT TO BE ACQUIRED |
|---|---|---|---|---|---|
| (A) ELECTRICITY COST SAVING AGENT | (A-1) POWER SAVING RECOMMENDATION /COMPARISON WITHIN AREA | ONE WEEK | HOUSEHOLD SIZE | AVERAGE VALUE OF VARIABLE UNIT PRICE ELECTRICITY RATES OF CONSUMERS HAVING THE SAME HOUSEHOLD SIZE | (1) DIFFERENCE BETWEEN VALUE OF CONSUMER OF INTEREST AND REFERENCE VALUE, (2) ABOVE OR BELOW REFERENCE VALUE? |
| | | ONE MONTH | HOUSEHOLD SIZE | | |
| | | ONE WEEK | HOUSEHOLD SIZE | AVERAGE VALUE OF FIXED UNIT PRICE ELECTRICITY RATES OF CONSUMERS HAVING THE SAME HOUSEHOLD SIZE | (1) DIFFERENCE BETWEEN VALUE OF CONSUMER OF INTEREST AND REFERENCE VALUE, (2) ABOVE OR BELOW REFERENCE VALUE? |
| | | ONE MONTH | HOUSEHOLD SIZE | | |
| | | ONE WEEK | HOUSEHOLD SIZE | AVERAGE VALUE OF AMOUNTS OF ELECTRIC POWER OF SYSTEM POWER RECEPTION OF CONSUMERS HAVING THE SAME HOUSEHOLD SIZE | (1) DIFFERENCE BETWEEN VALUE OF CONSUMER OF INTEREST AND REFERENCE VALUE, (2) ABOVE OR BELOW REFERENCE VALUE? |
| | | ONE MONTH | HOUSEHOLD SIZE | | |
| | | ONE WEEK | HOUSEHOLD SIZE | AVERAGE VALUE OF SURPLUS AMOUNTS OF ELECTRIC POWER OF SOLAR POWER GENERATION OF CONSUMERS HAVING THE SAME HOUSEHOLD SIZE | (1) DIFFERENCE BETWEEN VALUE OF CONSUMER OF INTEREST AND REFERENCE VALUE, (2) ABOVE OR BELOW REFERENCE VALUE? |
| | | ONE MONTH | HOUSEHOLD SIZE | | |
| | (A-2) POWER SAVING RECOMMENDATION /COMPARISON WITH PAST | ONE WEEK | — | VARIABLE UNIT PRICE ELECTRICITY RATE FOR THE PREVIOUS YEAR OF CONSUMER OF INTEREST | (1)DIFFERENCE BETWEEN VALUE OF CONSUMER OF INTEREST AND VALUE FOR THE PREVIOUS YEAR, (2) ABOVE OR BELOW VALUE FOR THE PREVIOUS YEAR? |
| | | ONE MONTH | — | | |
| | | ONE WEEK | — | FIXED UNIT PRICE ELECTRICITY RATE FOR THE PREVIOUS YEAR OF CONSUMER OF INTEREST | (1)DIFFERENCE BETWEEN VALUE OF CONSUMER OF INTEREST AND VALUE FOR THE PREVIOUS YEAR, (2) ABOVE OR BELOW VALUE FOR THE PREVIOUS YEAR? |
| | | ONE MONTH | — | | |
| | | ONE WEEK | — | AMOUNT OF ELECTRIC POWER OF SYSTEM POWER RECEPTION FOR THE PREVIOUS YEAR OF CONSUMER OF INTEREST | (1)DIFFERENCE BETWEEN VALUE OF CONSUMER OF INTEREST AND VALUE FOR THE PREVIOUS YEAR, (2) ABOVE OR BELOW VALUE FOR THE PREVIOUS YEAR? |
| | | ONE MONTH | — | | |
| | | ONE WEEK | — | SURPLUS AMOUNT OF ELECTRIC POWER OF SOLAR POWER GENERATION FOR THE PREVIOUS YEAR OF CONSUMER OF INTEREST | (1)DIFFERENCE BETWEEN VALUE OF CONSUMER OF INTEREST AND VALUE FOR THE PREVIOUS YEAR, (2) ABOVE OR BELOW VALUE FOR THE PREVIOUS YEAR? |
| | | ONE MONTH | — | | |
| (B) APPARATUS EFFECTIVE UTILIZATION AGENT | (B-1) POWER SAVING RECOMMENDATION /COMPARISON WITH PAST | ONE WEEK | — | AIR CONDITIONER POWER CONSUMPTION AMOUNT FOR THE PREVIOUS YEAR OF CONSUMER OF INTEREST | (1)DIFFERENCE BETWEEN VALUE OF CONSUMER OF INTEREST AND VALUE FOR THE PREVIOUS YEAR, (2) ABOVE OR BELOW VALUE FOR THE PREVIOUS YEAR? |
| | | ONE MONTH | — | | |
| | (B-2) EFFECTIVE UTILIZATION OF SOLAR POWER GENERATION | ONE WEEK | — | AMOUNT OF ELECTRIC POWER OF SOLAR POWER GENERATION FOR THE PREVIOUS YEAR OF CONSUMER OF INTEREST | (1)DIFFERENCE BETWEEN VALUE OF CONSUMER OF INTEREST AND VALUE FOR THE PREVIOUS YEAR, (2) ABOVE OR BELOW VALUE FOR THE PREVIOUS YEAR? |
| | | ONE MONTH | — | | |

FIG.5

| AGENT (KIND OF RECOMMENDATION) | RECOMMENDATION | ACCUMULATION PERIOD | DWELLER ATTRIBUTE | REFERENCE VALUE | RESULT TO BE ACQUIRED |
|---|---|---|---|---|---|
| (C) ACTUAL COMBINED FUEL EFFICIENCY IMPROVEMENT-AND-EXTERNAL CHARGING PROMOTION AGENT | (C-1) HOW TO USE PHV | ONE WEEK | — | AVERAGE VALUE OF EV TRAVELING RATIOS OF ALL CONSUMERS | (1) DIFFERENCE BETWEEN VALUE OF CONSUMER OF INTEREST AND REFERENCE VALUE, (2) ABOVE OR BELOW REFERENCE VALUE? |
| | | ONE MONTH | — | | |
| | | ONE WEEK | — | AVERAGE VALUE (km/l) OF ACTUAL COMBINED FUEL EFFICIENCIES OF ALL CONSUMERS | (1) DIFFERENCE BETWEEN VALUE OF CONSUMER OF INTEREST AND REFERENCE VALUE, (2) ABOVE OR BELOW REFERENCE VALUE? |
| | | ONE MONTH | — | | |
| | | ONE WEEK | — | AVERAGE VALUE OF TOTAL TRAVELING DISTANCES OF ALL CONSUMERS | (1) DIFFERENCE BETWEEN VALUE OF CONSUMER OF INTEREST AND REFERENCE VALUE, (2) ABOVE OR BELOW REFERENCE VALUE? |
| | | ONE MONTH | — | NUMBER OF TIMES OF CHARGING WITHIN ONE MONTH (NUMBER OF CALENDAR DAYS WITHIN ONE MONTH) ASSUMING THAT PHV IS CHARGED ONCE A DAY | (1) DIFFERENCE BETWEEN CHARGING COUNT OF CONSUMER OF INTEREST AND REFERENCE VALUE (NUMBER OF CALENDAR DAYS), (2) ABOVE OR BELOW REFERENCE VALUE? |
| | | ONE MONTH | — | THRESHOLD VALUE OF CAR AIR CONDITIONER USAGE RATIO | (1) DIFFERENCE BETWEEN CAR AIR CONDITIONER USAGE RATIO OF CONSUMER OF INTEREST AND REFERENCE VALUE, (2) ABOVE OR BELOW REFERENCE VALUE? |
| (D) HEAT SOURCE TRANSFORMATION AGENT | (D-1) GASOLINE COST SAVING | ONE MONTH | — | ELECTRICITY COST RA IN CASE WHERE TRAVELING BY GASOLINE CORRESPONDING TO ONE-MONTH GASOLINE COST IS REPLACED BY EV TRAVELING (*1) | (1) DIFFERENCE BETWEEN ACTUAL GASOLINE COST AND REFERENCE VALUE |

*1 (ELECTRICITY COST RA IN CASE OF REPLACEMENT BY EV TRAVELING)=(ONE-MONTH GASOLINE COST)−((HV TRAVELING DISTANCE)/(EV TRAVELING DISTANCE))·(FIXED POWER RATE UNIT PRICE), (ONE-MONTH GASOLINE COST)=(((HV TRAVELING DISTANCE)/(HV FUEL EFFICIENCY))×(EV TRAVELING DISTANCE))·(GASOLINE UNIT PRICE)

FIG.6

(A)
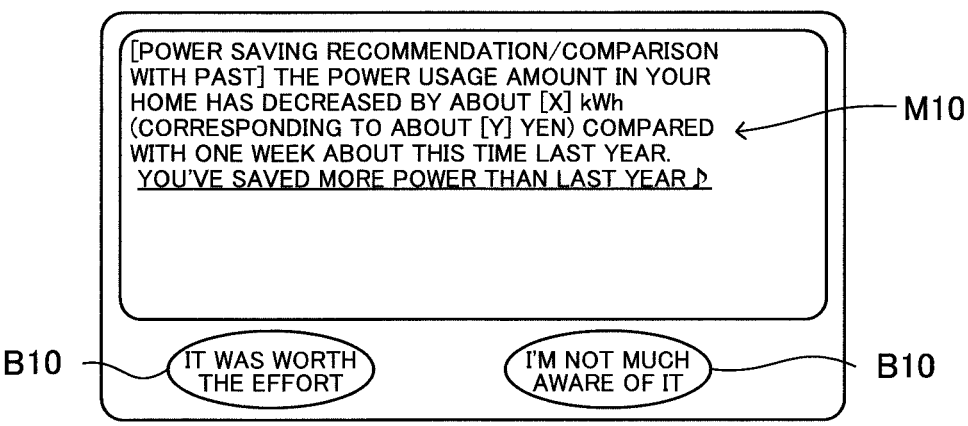

(A) ELECTRICITY COST SAVING AGENT, (A-1) "POWER SAVING RECOMMENDATION/ COMPARISON WITH PAST" RECOMMENDATION, ACCEPTABILITY LEVEL: 2, AIDAS: FIRST STAGE, COMPARISON RESULT: CASE OF BEING BELOW REFERENCE VALUE (B)
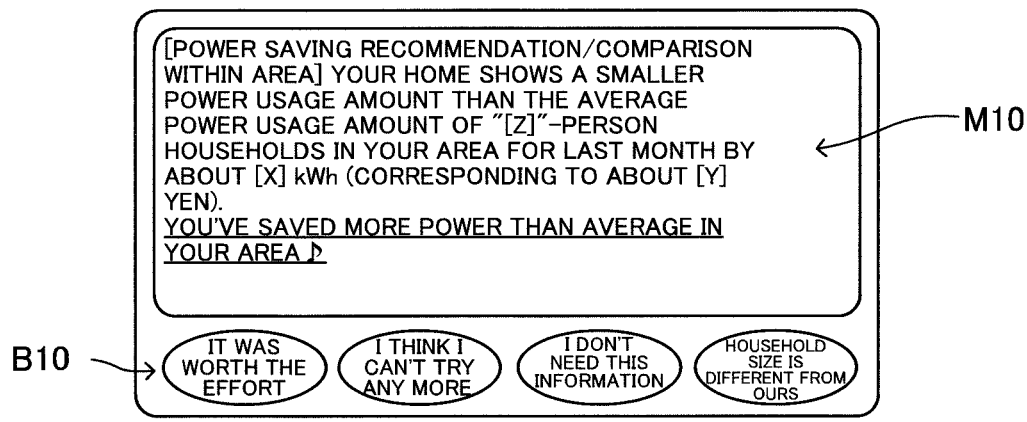

(A) ELECTRICITY COST SAVING AGENT, (A-2) "POWER SAVING RECOMMENDATION/COMPARISON WITHIN AREA" RECOMMENDATION, ACCEPTABILITY LEVEL: 2, AIDAS: SECOND STAGE, COMPARISON RESULT: CASE OF BEING BELOW REFERENCE VALUE (C)
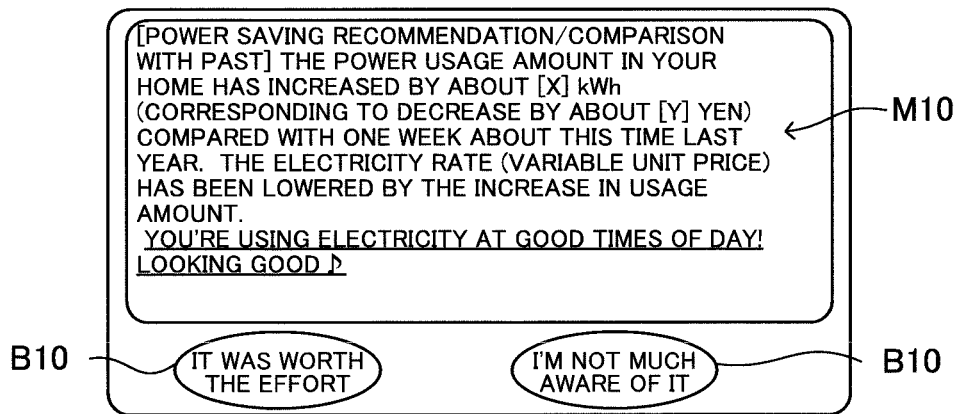

(A) ELECTRICITY COST SAVING AGENT, (A-1) "POWER SAVING RECOMMENDATION/ COMPARISON WITH PAST" RECOMMENDATION, ACCEPTABILITY LEVEL: 2, AIDAS: THIRD STAGE, COMPARISON RESULT: CASE OF BEING ABOVE FIRST REFERENCE VALUE AND BELOW SECOND REFERENCE VALUE

FIG.8

(A)
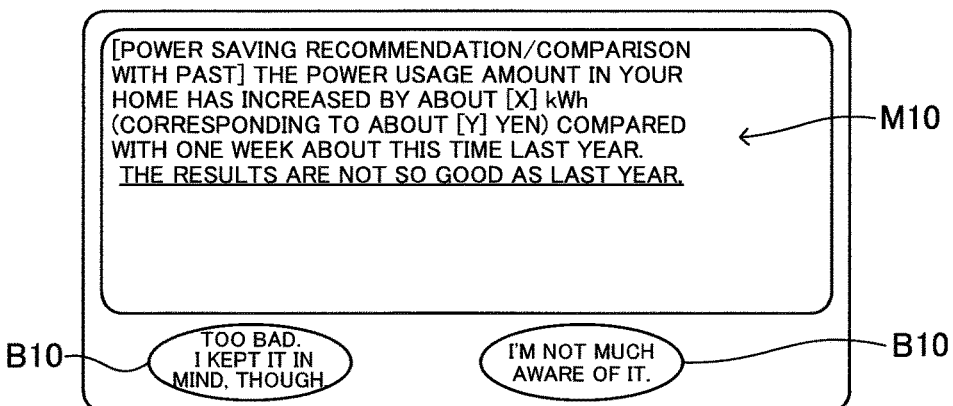
(A) ELECTRICITY COST SAVING AGENT, (A-1) "POWER SAVING RECOMMENDATION/COMPARISON WITH PAST" RECOMMENDATION, ACCEPTABILITY LEVEL: -2, AIDAS: FIRST STAGE, COMPARISON RESULT: CASE OF BEING ABOVE REFERENCE VALUE (B)
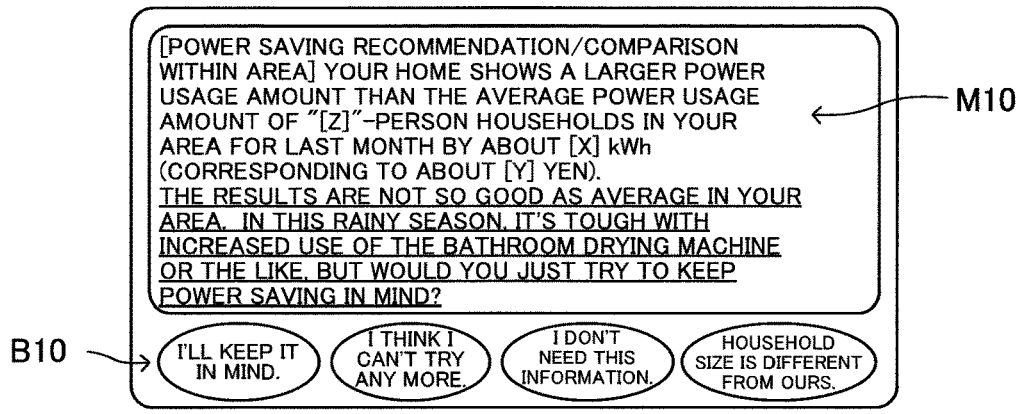
(A) ELECTRICITY COST SAVING AGENT, (A-2) "POWER SAVING RECOMMENDATION/COMPARISON WITHIN AREA" RECOMMENDATION, ACCEPTABILITY LEVEL: -2, AIDAS: SECOND STAGE, COMPARISON RESULT: CASE OF BEING ABOVE REFERENCE VALUE (C)
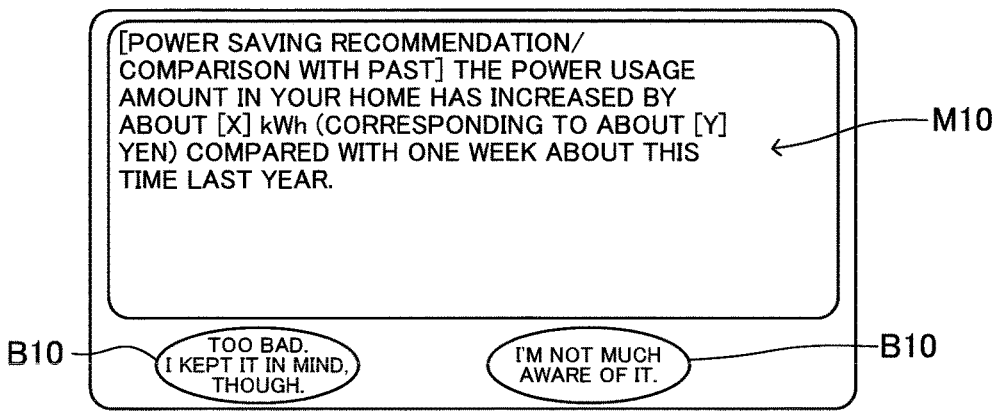
(A) ELECTRICITY COST SAVING AGENT, (A-1) "POWER SAVING RECOMMENDATION/COMPARISON WITH PAST" RECOMMENDATION, ACCEPTABILITY LEVEL: -2, AIDAS: THIRD STAGE, COMPARISON RESULT: CASE OF BEING ABOVE FIRST REFERENCE VALUE AND ABOVE SECOND REFERENCE VALUE

FIG.9

(A) 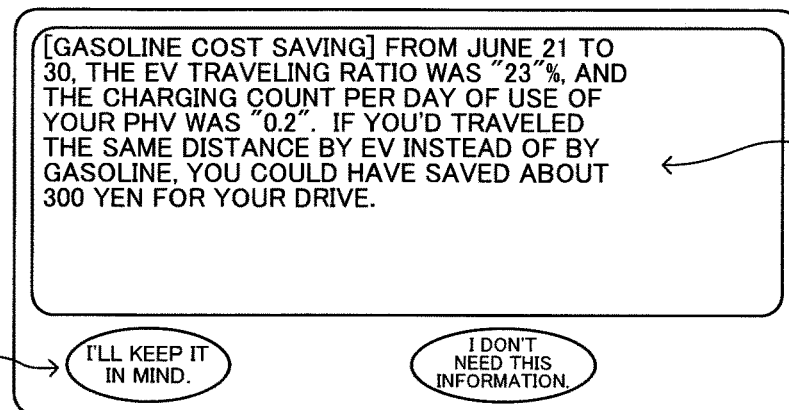
(D) HEAT SOURCE TRANSFORMATION AGENT, (D-1) "GASOLINE COST SAVING" RECOMMENDATION, ACCEPTABILITY LEVEL: -1, AIDAS: FIRST STAGE (ATTENTION/INTEREST)

(B) 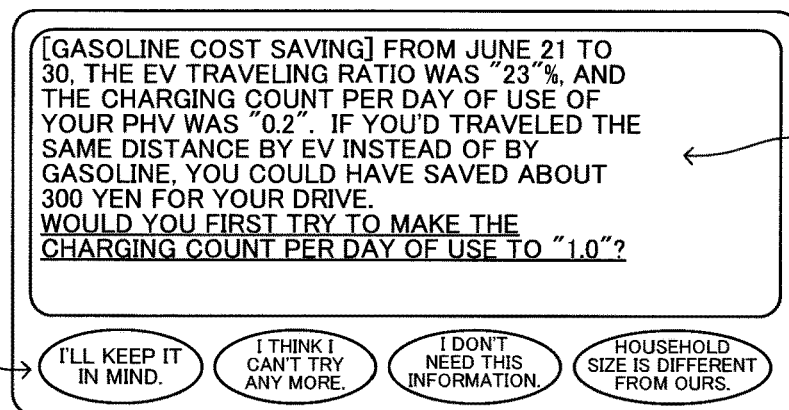
(D) HEAT SOURCE TRANSFORMATION AGENT, (D-1) "GASOLINE COST SAVING" RECOMMENDATION, ACCEPTABILITY LEVEL: -1, AIDAS: SECOND STAGE (DESIRE/ACTION)

(C) 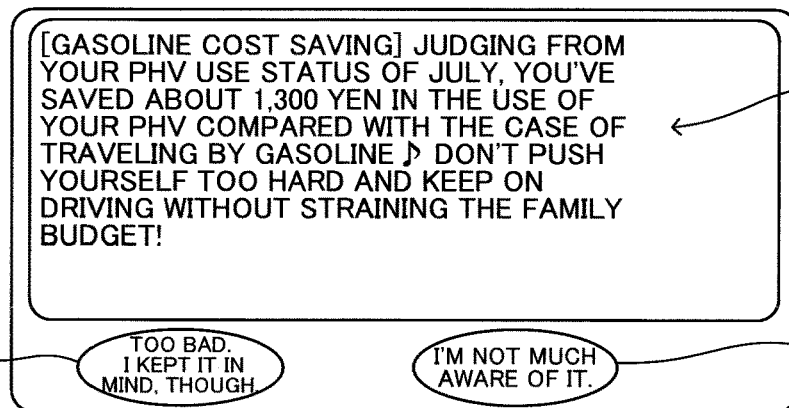
(D) HEAT SOURCE TRANSFORMATION AGENT, (D-1) "GASOLINE COST SAVING" RECOMMENDATION, ACCEPTABILITY LEVEL: -1, AIDAS: THIRD STAGE (SATISFACTION)

FIG.10

ENERGY SAVING SUPPORT SYSTEM

CROSS-REFERENCE TO RELATED APPLICATIONS

This is a Continuation of application Ser. No. 15/521,501 filed Apr. 24, 2017, which in turn is a National Stage of International Patent Application No. PCT/JP2015/078525 filed on Oct. 7, 2015, which claims the benefit of Japanese Patent Application No. 2014-216537 filed Oct. 23, 2014. The disclosure of the prior applications is hereby incorporated by reference herein in its entirety.

TECHNICAL FIELD

The present invention relates to a system, comprising a data terminal configured to provide a consumer with energy consumption-related data, and a data providing apparatus configured to transmit the energy consumption-related data to the data terminal.

BACKGROUND ART

Hitherto, there is known a support system for transmitting an "energy saving action plan that defines handling of a load apparatus" for reducing an energy consumption amount to a terminal of a consumer (see, for example, Japanese Patent Application Laid Open Publication No. JP 2010-176373 A).

SUMMARY OF INVENTION

Incidentally, a degree of interest in a provided energy saving action plan differs among consumers. Some consumers may be highly interested in a given energy saving action plan and may not be interested in another energy saving action plan.

Therefore, even when the provided energy saving action plan is generally effective for energy saving, some consumers may feel annoyed rather than finding such advice effective.

The present invention has been made in order to handle the above-mentioned problem. That is, one of objects of the present invention is to provide a system configured to be able to transmit the energy consumption-related data corresponding to a degree of interest (acceptability level) of a consumer.

In this description, the claims, the drawings, and the like (hereinafter referred to as "this description and the like"), the "consumer" is used as a term meaning "all dwellers dwelling in one house (residence)". The "energy consumption-related information" used in this description and the like means information useful for energy saving, energy cost reduction, and the like, which relates to energy consumption caused by the consumer. The energy consumption-related information may sometimes include only a fact relating to the energy consumption, e.g., a comparison between track records of energy consumption amounts of a consumer of interest during the same period in the previous year and the current year or a comparison between track records of energy consumption amounts of a consumer of interest and another consumer, and may at other times also include a suggestion about a specific action (for example, action for energy saving).

In order to achieve the above-mentioned object, a "system according to one embodiment of the present disclosure (hereinafter also simply referred to as "system of the present disclosure")" comprises at least:

a data terminal configured to provide a consumer with energy consumption-related data; and a data providing apparatus, including a data accumulation apparatus, configured to transmit the energy consumption-related data to the data terminal.

In the system of the present disclosure, the data terminal transmits data corresponding to a button operation at the data terminal to the data providing apparatus;

the data providing apparatus determines an acceptability level, which indicates a degree of interest in the energy consumption-related data, based on at least a content of the button operation; and the energy consumption-related data is provided to the data terminal based on the determined acceptability level.

According to the system of the present disclosure, the consumer can be provided with the "energy consumption-related data" corresponding to the degree of interest (acceptability level) of the consumer.

In some embodiments, the system includes at least:

an information terminal configured to provide a consumer, who has an electric load to which electric energy is supplied from an electric power supply system within a residence including a "house and land accompanying the house", with energy consumption-related information (data) relating to energy consumption caused by the consumer; and an information providing apparatus including a data accumulation apparatus and a computer and being configured to transmit the energy consumption-related information to the information terminal, and to present the energy consumption-related information on the information terminal.

The electric loads may include not only a home electric appliance but also, for example, a charging apparatus and/or a charging-and-discharging apparatus configured to charge an "in-vehicle storage battery for driving a vehicle" of a plug-in hybrid vehicle (PHV), an electric vehicle (EV), or the like.

Further, in the system:

the information terminal is configured to be capable of transmitting information corresponding to a button operation conducted for the information terminal to the information providing apparatus; and the information providing apparatus is configured to determine an acceptability level, which stepwise indicates a degree of interest of the consumer in the energy consumption-related information, based on "at least a content of the button operation conducted by the consumer when the energy consumption-related information is presented to the consumer through the information terminal", and to determine the energy consumption-related information to be newly provided to the consumer based on the determined acceptability level.

Therefore, according to the system, the consumer is provided with the "energy consumption-related information" corresponding to the degree of interest (acceptability level) of the consumer. As a result, it becomes highly probable that the consumer may implement an action that is based on the energy consumption-related information, and hence it is possible to increase the effectiveness of energy saving, energy cost reduction, and the like.

Incidentally, for example, when a power consumption amount of a given consumer greatly decreases after specific energy consumption-related information including an action plan relating to power saving is presented to the given consumer, it is possible to determine that the consumer has taken a power-saving action based on the specific energy consumption-related information. In this case, it is possible to automatically (namely, without conducting a questionnaire) determine that the acceptability level of the consumer regarding the specific energy consumption-related information is extremely high.

Thus, in one aspect of the system, the information providing apparatus is configured to determine, based on track record data relating to the energy consumption of the consumer, whether or not the consumer has implemented an action that is based on the energy consumption-related information after presenting the energy consumption-related information to the consumer, and to (automatically) change the acceptability level based on a result of the determination.

Further, for example, it is highly probable that the energy consumption amount greatly differs between consumers different in household size. Therefore, even when information obtained by comparing an amount relating to energy consumption (including, for example, a power consumption amount and an electricity rate) of a given consumer with an amount relating to energy consumption of a consumer having a household size different from the household size of the given consumer is provided to the given consumer as the energy consumption-related information, it is highly probable that such information may not be meaningful to the given consumer.

Thus, in another aspect of the system, the information providing apparatus is configured to determine the energy consumption-related information to be presented to the consumer based also on information indicating a dweller attribute being a property of the consumer, which exerts an influence on the energy consumption of the consumer.

The dweller attribute is not limited to the household size, and can include different kinds of attributes as described later.

According to this aspect, the energy consumption-related information becomes information which corresponds to the dweller attribute of each consumer, and hence it is possible to further increase the effectiveness of energy saving, energy cost reduction, and the like.

In another aspect of the system, the information providing apparatus is configured to transmit information including a questionnaire for inquiring about the dweller attribute to the information terminal, to present the information including the questionnaire on the information terminal, to acquire an answer to the questionnaire based on the information corresponding to the button operation conducted by the consumer, and to update the information indicating the dweller attribute based on the acquired answer.

According to this aspect, the dweller attribute can be updated based on the answer obtained from the consumer. Therefore, the energy consumption-related information can be provided based on the correct dweller attribute, and hence it is possible to further increase the effectiveness of energy saving, energy cost reduction, and the like.

Further, the information providing apparatus according to this aspect is configured to determine, based on track record data relating to the energy consumption of the consumer, whether or not it is highly probable that the dweller attribute has changed, to transmit the information including the questionnaire to the information terminal when determining that it is highly probable that the dweller attribute has changed, and to present the information including the questionnaire on the information terminal.

According to this aspect, the questionnaire regarding the dweller attribute can be provided at an appropriate timing, which reduces the probability that an unnecessary questionnaire may be issued. As a result, it is possible to reduce the probability that the consumer may feel annoyed about the questionnaire regarding the dweller attribute.

Incidentally, as described later, according to the AIDAS formula, a consuming action of a consumer is formed after undergoing the stages of attention (A), interest (I), desire (D), action (A), and satisfaction (S). Therefore, when the energy consumption-related information corresponding to each of those stages can be provided, the energy consumption-related information becomes information corresponding to a behavioral psychology of the consumer.

Thus, in another aspect of the system, the information providing apparatus is configured to determine a stage corresponding to processes of an AIDAS formula based on a length of a period after the energy consumption-related information starts being presented, and to change wording of the energy consumption-related information to be presented to the consumer based on the determined stage.

According to this aspect, the energy consumption-related information corresponding to the behavioral psychology of the consumer can be provided, and hence it is possible to increase the effectiveness of energy saving, energy cost reduction, and the like with more reliability.

Other objects, other features, and accompanying advantages of the present disclosure are easily understandable from a description of an embodiment of the present disclosure to be given with reference to the following drawings. It should be understood that the present disclosure relates to not only the energy saving support system but also a method to be used by the energy saving support system and individual apparatus that form the energy saving support system.

BRIEF DESCRIPTION OF DRAWINGS

FIG. 3 shows diagrams for illustrating examples of a questionnaire presented on an information terminal illustrated in FIG. 1.

FIG. 4 is a table for showing an example of answers (display contents of response buttons) to be used for determining an acceptability level.

FIG. 5 is a table for showing an example of "an agent, a recommendation, an accumulation period, a dweller attribute, a reference value, and a result to be acquired".

FIG. 6 is a table for showing an example of "an agent, a recommendation, an accumulation period, a dweller attribute, a reference value, and a result to be acquired".

FIG. 8 shows diagrams for illustrating examples of the template of the "recommendation wording and response buttons".

FIG. 9 shows diagrams for illustrating examples of the template of the "recommendation wording and response buttons".

FIG. 10 shows diagrams for illustrating examples of the "recommendation wording and response buttons".

DESCRIPTION OF EMBODIMENTS (Configuration of System)

Figure 1:
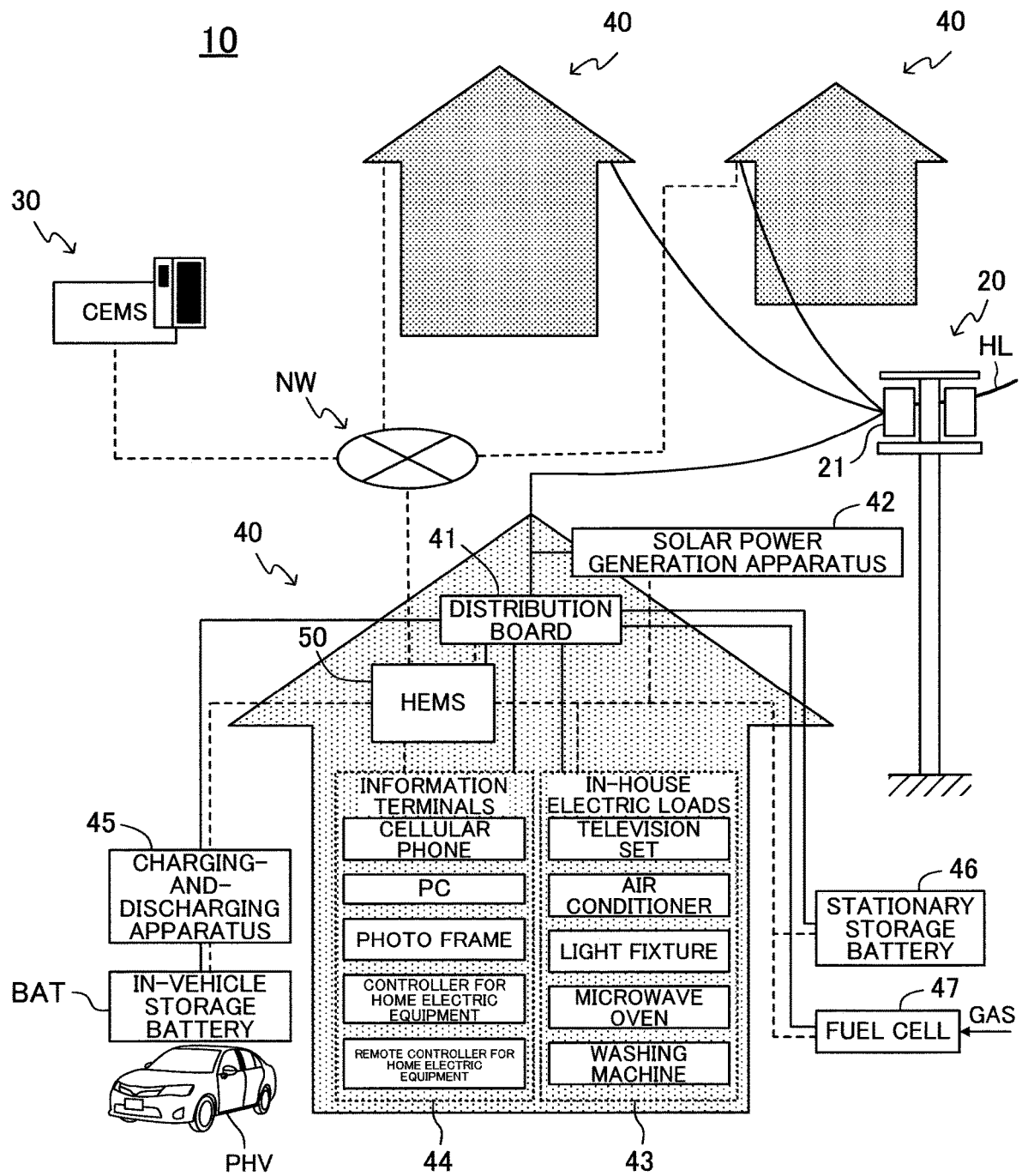
FIG. 1 is a diagram of a schematic configuration of an energy saving support system according to an embodiment of the present disclosure.

FIG. 1 is a diagram of a schematic configuration of an energy saving support system (hereinafter also referred to as "this system") 10 according to an embodiment of the present disclosure. This system 10 includes a commercial power supply system 20, a community energy management system (CEMS) 30, and houses 40 of a plurality of consumers (individual users of electric power). In FIG. 1, the solid lines each indicate an electric power line, and the broken lines each indicate a data communication line.

The commercial power supply system (electric power supply system) 20 is a system for transmitting electric power generated by a power plant (for example, thermal power plant) of an electric power supplier (electric power company) to "user facilities including the houses 40 and offices (not shown)". The commercial power supply system 20 includes a pole-mounted transformer (hereinafter referred to as a "potential transformer") 21 connected to a high-voltage power distribution line HL. The high-voltage power distribution line HL is connected to a "distribution substation to which the electric power is sent from the power plant", and a high voltage (for example, 6,600 V) is applied to the high-voltage power distribution line HL. The potential transformer 21 is configured to change (transform) the high voltage to a voltage (for example, 100 V) that is available in the houses 40, the offices, and the like. In general, one potential transformer 21 is connected to a plurality of houses 40, and the electric power is supplied to a plurality of the houses 40 via the one potential transformer 21.

The CEMS 30 is an energy management system configured to manage a supply amount of the electric power supplied from the power plant to an area of a management target, an amount of electric power generated by solar power generation apparatuses owned by the consumers within the area of the management target, a power consumption amount (electric power demand) in the area of the management target, and the like. The CEMS 30 includes a computer (processor unit) and a data accumulation apparatus.

The house 40 includes a distribution board 41, a solar power generation apparatus 42, in-house electric loads 43, information terminals 44, a charging-and-discharging apparatus 45, a stationary storage battery 46, a fuel cell (or heat pump type water heater) 47, and a HEMS 50.

The distribution board 41 is connected to the potential transformer 21, and is configured to receive the electric power from the commercial power supply system 20 via the potential transformer 21. Further, the distribution board 41 is connected to the solar power generation apparatus 42, the stationary storage battery 46, and the fuel cell 47, and is configured to receive the electric power from the solar power generation apparatus 42, the stationary storage battery 46, and the fuel cell 47. In addition, the distribution board 41 is connected to the in-house electric loads 43, the information terminals 44, the charging-and-discharging apparatus 45, and the like, and is configured to distribute the electric power to the in-house electric loads 43, the information (data) terminals 44, the charging-and-discharging apparatus 45, and the like.

The solar power generation apparatus 42 is an apparatus configured to generate electric power through use of sunlight, and includes a solar panel (not shown) and a power controller (not shown). The solar power generation apparatus 42 is also connected to the potential transformer 21, and is configured to be able to supply the electric power generated by the solar power generation apparatus 42 to the commercial power supply system 20 via the potential transformer 21. The power controller of the solar power generation apparatus 42 is configured to be able to adjust the electric power generated by the solar panel.

The in-house electric loads 43 include home electric equipment, e.g., a television set, a house air conditioner, a light fixture, a microwave oven, and a washing machine.

The information terminals 44 include a cellular phone, a personal computer (PC) including a display, a photo frame, a controller for home electric equipment, and a remote controller for home electric equipment.

The charging-and-discharging apparatus 45 is an apparatus configured to charge a "battery for driving an automobile (hereinafter also simply referred to as an "in-vehicle storage battery") BAT" mounted on a plug-in hybrid vehicle (PHV) of the consumer. The in-vehicle storage battery BAT may be a battery mounted on an electric vehicle (EV). The charging-and-discharging apparatus 45 is further configured to supply the electric power from the in-vehicle storage battery BAT to the in-house electric loads 43 via the distribution board 41. Each of apparatus that consume electric power, e.g., the in-house electric loads 43, the information terminals 44, and the charging-and-discharging apparatus 45 is also referred to simply as an "electric load". The electric load consumes electric power "within a residence including a house and a land accompanying the house" of the consumer.

The stationary storage battery 46 is configured to appropriately accumulate/store the electric power from the potential transformer 21, the solar power generation apparatus 42, and the like, and to appropriately supply the accumulated electric power to the distribution board 41.

The fuel cell 47 is configured to generate electric power based on the supplied gas, and to appropriately supply the generated electric power to the distribution board 41.

In the following description, for the sake of brevity of description, the electric power supplied from the stationary storage battery 46 and the fuel cell 47 to the distribution board 41 is not taken into consideration.

The home energy management system (HEMS) 50 includes a computer (processor unit), a data accumulation apparatus, a display, and the like. The HEMS 50 is connected to the distribution board 41, the power controller of the solar power generation apparatus 42, the in-house electric loads 43, the information terminals 44, the charging-and-discharging apparatus 45, a computer for controlling the PHV, and the like in a communicable manner (in a manner that allows wireless communications and/or wired communications), and is configured to receive information (data) from those apparatus, and to transmit information including control signals to those apparatus.

Further, the HEMS 50 is communicably connected to the CEMS 30 through a network NW, and is configured to transmit information to the CEMS 30, and to receive information from the CEMS 30.

(Descriptions of Terms)

Now, descriptions are made of meanings of key terms relating to this system 10. Information described below may be referred to as data.

Recommendation (message): energy consumption-related information useful for energy saving, energy cost reduction, and the like, which is to be displayed on "the photo frame and/or the display of the PC" of the information terminals 44 within this system 10 (refer to FIG. 8 to FIG. 10). The recommendation may include only a questionnaire (refer to FIG. 3). The recommendation including a questionnaire is also referred to "questionnaire recommendation".

Agent: a function unit of the CEMS 30, which is configured to issue a specific recommendation. In this example, the agent has the following four kinds. Hence, a specific recommendation corresponds to any one of the following agents:

(A) an electricity cost saving agent;
(B) an apparatus effective utilization agent;
(C) an actual combined fuel efficiency improvement-and-external charging promotion agent; and
(D) a heat source transformation agent.

The respective agents described above are configured to issue individual recommendations described below.

(A) The electricity cost saving agent is configured to issue:
 (A-1) a "power saving recommendation/comparison within the area" recommendation; and
 (A-2) a "power saving recommendation/comparison with the past" recommendation.

(B) The apparatus effective utilization agent is configured to issue:
 (B-1) a "power saving recommendation/(apparatus-specific) comparison with the past" recommendation; and
 (B-2) an "effective utilization of solar power generation" recommendation. In this example, the item (B-1) described above is the "power saving recommendation/comparison with the past" recommendation for the house air conditioner.

(C) The actual combined fuel efficiency improvement-and-external charging promotion agent is configured to issue:
 (C-1) a "how to use the PHV" recommendation.

(D) The heat source transformation agent is configured to issue:
 (D-1) a "gasoline cost saving" recommendation.

Acceptability level: a degree indicating how much the consumer is interested in the recommendation or how well the recommendation matches daily habits of the consumer.

Dweller attribute: the term means a property or a characteristic that relates to energy consumption of the consumer. For example, the dweller attribute may include the following attribute, but the present disclosure is not limited thereto.

(1) Attributes relating to a house:
the number of dwellers (namely, residents or, in general, family members) who live in the house 40 (hereinafter referred to as a "household size");
an age structure of the dwellers who live in the house 40;
the number of supporters and the number of dependents among the dwellers who live in the house 40;
an electricity contract plan concluded between the consumer and the electric power supplier, examples of which include information indicating whether or not usage-based pricing is effective and information on a contract amperage (maximum allowable power consumption); and
energy costs other than for electric power (for example, kerosene cost and gas cost).

(2) Attributes relating to a vehicle:
the number of possessed vehicles;
the number of possessed PHVs;
the number of possessed electric vehicles (EVs);
the number of vehicles for use in commutation to work or school; and
a charging cost in a case where the vehicle is charged at a place other than the house 40.

AIDAS formula: a theory in direct marketing, which explains a process of product purchase (consuming action) (theory relating to a purchase decision process of the consumer). According to the AIDAS formula, the consuming action of the consumer for a product or a service has stages of attention (A), interest (I), desire (D), action (A), and satisfaction (S). In this example, the stages corresponding to processes of the AIDAS formula (hereinafter referred to as a "AIDAS process stage") are classified into the following three stages, and as described later, contents of the recommendation are changed based on the AIDAS process stage to which the current time point belongs.

First stage: a stage of attention (A) and interest (I).
Second stage: a stage of desire (D) and action (A).
Third stage: a stage of satisfaction (S).

(Outline of Operation of this System)

Next, a description is made of an outline of an operation of this system 10. This system 10 generates various recommendations (energy consumption-related information) based on track record data relating to the energy consumption of an individual consumer. At this time, this system 10 changes wording of the recommendation based on the acceptability level of the individual consumer regarding the recommendation, the dweller attribute of the individual consumer, the AIDAS process stage of the individual consumer regarding the recommendation, and the like.

For example, when issuing a recommendation of a given kind to a consumer of interest, this system 10 changes the wording of the recommendation based on the acceptability level of the consumer regarding the recommendation. For example, the wording of the recommendation is changed to the wording "Keep . . . ing for more power saving." for a consumer having a high acceptability level, while the wording of the recommendation is changed to the wording "Would you first try . . . ing?", which is easy to be accepted, for a consumer having a low acceptability level. This allows this system 10 to issue a recommendation that is easy to be accepted by the consumer.

For example, when the household size is used as the dweller attribute, this system 10 issues a recommendation obtained by comparing a power consumption amount of the consumer of interest with a power consumption amount of another consumer having the same household size as the household size of the consumer of interest (refer to FIG. 8(B) and FIG. 9(B)). This allows this system 10 to issue a recommendation that is meaningful to the consumer and easy to be accepted by the consumer.

For example, when determining that the AIDAS process stage is the "first stage (attention/interest)", this system 10 provides "information excluding a suggestion about a specific action and including only a track record of the consumer of interest", as the recommendation (refer to FIG. 10(A)). Further, for example, when determining that the AIDAS process stage is the "second stage (desire/action)", this system 10 provides "information including a suggestion of a specific action in addition to a track record of the consumer of interest", as the recommendation (refer to FIG. 10(B)). By thus changing the recommendation based on the stage corresponding to processes of the AIDAS formula, it is possible to issue the recommendation that is easy to be accepted by the consumer. There may coexist recommendations (messages) corresponding to two stages within one recommendation. In that case, this system 10 displays the recommendations in ascending order of the stage (i.e., from a lower stage in order).

(Specific Operation)

Next, a description is made of a specific operation of the computer (hereinafter referred to as a "CEMS") of the CEMS 30 of this system 10. The CEMS is configured to execute a routine illustrated in the flowchart of FIG. 2 for each consumer every time a predetermined period elapses (for example, once a day). Therefore, when a predetermined timing is reached, the CEMS conducts processing of Step 200 to Step 900 in order.

<Acquisition of Track Record Data>

Step 200: the CEMS reads the track record data (electric power-related track record data and vehicle-related track record data) from the data accumulation apparatus of the CEMS, and obtains necessary track record data through calculation based on the read track record data. More specifically, the CEMS conducts the processing of Step 201 to Step 203 described below in order, and then proceeds to Step 300. It should be noted that the CEMS automatically acquires the track record data from the HEMS 50 of each consumer, and stores the acquired track record data in the data accumulation apparatus of the CEMS for each consumer and for each date and time at which the track record data was obtained. The CEMS further acquires the track record data that cannot be automatically acquired from the HEMS 50 through use of the questionnaire recommendation.

Step 201: the CEMS reads (acquires) the electric power-related track record data from the data accumulation apparatus. The read electric power-related track record data includes the following data.

Power consumption amount: an amount of electric power consumed in the house 40.

Amount of the electric power of solar power generation: an "amount of electric power generated by the solar power generation apparatus 42".

Fixed unit price power rate: an "electricity rate based on a fixed power rate unit price presented by the electric power supplier".

Variable unit price electricity rate: an electricity rate based on a "power rate unit price (for example, real time pricing (RTP) unit price) varying for each time slot (for example, every 30 minutes)" presented by the electric power supplier.

House air conditioner power consumption amount: an amount of electric power consumed by the air conditioner being one of the in-house electric loads 43. The house 40 includes an exclusive electric power route dedicated to the air conditioner, and the HEMS 50 acquires the house air conditioner power consumption amount from a current flowing through the route, and transmits the house air conditioner power consumption amount to the CEMS.

The CEMS further acquires the electric power-related track record data described below through calculation based on the read electric power-related track record data.

Amount of electric power of system power reception: an amount of electric power also referred to as "system incoming amount", which has a value obtained by subtracting the amount of the electric power of solar power generation from the power consumption amount ((amount of the electric power of system power reception)=(power consumption amount)−(amount of the electric power of solar power generation)). When the amount of the electric power of system power reception has a negative value as a result of the calculation, the amount of the electric power of system power reception is set to "0". The amount of the electric power of system power reception may be separately measured in the house 40, and the measurement result may be transmitted from the HEMS 50 to the CEMS.

Surplus amount of electric power of solar power generation: an amount of electric power having a value obtained by subtracting the power consumption amount from the amount of the electric power of solar power generation ((surplus amount of the electric power of solar power generation)= (amount of the electric power of solar power generation)− (power consumption amount)). When the surplus amount of the electric power of solar power generation has a negative value as a result of the calculation, the surplus amount of the electric power of solar power generation is set to "0". The surplus amount of the electric power of solar power generation may be calculated by the HEMS 50, and the calculation result may be transmitted from the HEMS 50 to the CEMS.

Step 202: the CEMS reads (acquires) the vehicle-related track record data from the accumulation apparatus. The read vehicle-related track record data includes the following data. Those pieces of data are transmitted from the computer for controlling the PHV to the HEMS 50, and then transmitted to the CEMS to be accumulated. In some cases, those pieces of data are transmitted from the HEMS 50 to the CEMS to be accumulated through use of the questionnaire recommendation.

EV traveling distance: an EV traveling distance of the PHV. That is, a distance traveled by the PHV through use of only the electric motor without operation of an internal combustion engine.

Total traveling distance: a traveling distance of the PHV.

Charging count: the number of times that the in-vehicle storage battery BAT of the PHV was charged by the charging-and-discharging apparatus 45 or another charging apparatus.

Operating time of a compressor of a vehicle air conditioner (car air conditioner): a time period during which a compressor of the vehicle air conditioner of the PHV was in operation.

Vehicle operating time: a time period during which a system of the PHV was in an on state. That is, a time period during which the PHV was in a state that it was able to travel.

Gasoline usage amount: an amount of gasoline consumed by the PHV.

Actual gasoline cost: a gasoline cost paid in actuality.

External charging cost: a cost borne when the in-vehicle storage battery BAT of the PHV was charged through use of a "paid external charging apparatus other than the charging-and-discharging apparatus 45".

The CEMS further acquires the vehicle-related track record data described below through calculation based on the read vehicle-related track record data.

EV traveling ratio: a ratio of EV traveling conducted by the PHV, which is calculated by dividing the EV traveling distance by the total traveling distance.

Actual combined fuel efficiency: a substantial specific fuel consumption of the PHV, which is calculated by dividing the total traveling distance by the gasoline usage amount.

Fuel efficiency of the internal combustion engine: a specific fuel consumption of the internal combustion engine itself mounted on the PHV, which is calculated in this case by dividing an HV traveling distance by the gasoline usage amount. The HV traveling distance is a distance traveled by the PHV through use of the internal combustion engine, which is calculated by subtracting the EV traveling distance from the total traveling distance.

Vehicle air conditioner usage ratio: a ratio of usage of the vehicle air conditioner, which is calculated by dividing the operating time of the compressor of the vehicle air conditioner by the vehicle operating time.

<Updating Dweller Attribute (Making Dweller Attribute Up-to-Date)>

Step 300: the CEMS updates the dweller attribute. In this example, the dweller attribute includes the household size and the electricity contract plan concluded between the electric power supplier and the consumer. More specifically, the CEMS conducts the processing of Step 301 to Step 304 described below in order, and then proceeds to Step 400. It should be noted that an initial value of the household size of the consumer is set at "1", and an initial value of the electricity contract plan is set at "meter rate lighting B-30A".

Step 301: the CEMS analyzes the track record data acquired in Step 200, and determines whether or not there is a deep doubt (high probability) that the dweller attribute has changed. In this example, this determination is conducted in the following manner.

The CEMS acquires and compares an average value of a "power consumption amount corresponding to one day during a period from two months and one day before until one month and one day before" (hereinafter referred to as "past average value" for the sake of convenience) of the consumer of interest and an average value of a "power consumption amount corresponding to one day during a period from one month before until the day before (yesterday)" (hereinafter referred to as "present average value" for the sake of convenience).

Subsequently, when the present average value has quickly increased from the past average value by equal to or larger than a first predetermined value or has quickly decreased from the past average value by equal to or larger than the first predetermined value, the CEMS determines that it is highly probable that the household size of the consumer of interest has changed.

The CEMS further compares the power consumption of the consumer of interest per day with the power consumption per day of the consumer having the same household size as the household size of the consumer of interest. When the power consumption per day of the consumer of interest is larger than the power consumption per day of the consumer having the same household size by equal to or larger than a second predetermined value or is smaller by equal to or larger than the second predetermined value, the CEMS determines that it is highly probable that the household size of the consumer of interest is different from the "household size which the CEMS has recognized/grasped".

In addition, when the "power consumption per day for the respective days from eight days before until the day before (yesterday)" of the consumer exceeds the "maximum allowable power consumption defined in the electricity contract plan for the consumer", which the CEMS has recognized/grasped, equal to or larger than a predetermined number of times, the CEMS determines that it is highly probable that the consumer has changed the electricity contract plan.

Step 302: the CEMS issues a "questionnaire (questionnaire recommendation) for examining the dweller attribute" to the consumer as necessary. More specifically, when the CEMS has determined based on the above-mentioned analysis of Step 301 that it is highly probable that the household size of the consumer of interest has changed, the CEMS issues a questionnaire for examining the above-mentioned matter (change of the household size) to the consumer. As described later, in a case where the answer "The household size is different from ours." was obtained from the consumer when a normal recommendation (which is not a questionnaire recommendation) was presented to the consumer, the CEMS also issues a questionnaire for examining the above-mentioned matter (change of the household size) to the consumer. When receiving this questionnaire, the HEMS 50 of the consumer displays the questionnaire on the photo frame and/or the display of the PC.

As illustrated in FIG. 3(A), an example of the wording of this questionnaire is "Could you please tell us your current household size, if it is OK with you?". In addition, this questionnaire includes answer buttons (response buttons) that allow the consumer to answer (notify the CEMS of) the household size. As illustrated in FIG. 3(A), an example of display contents of the answer buttons is "1 person", "2 persons", "3 persons" . . . "6 persons", and "7 or more persons".

When the CEMS has determined based on the above-mentioned analysis of Step 301 that it is highly probable that the consumer has changed the electricity contract plan, the CEMS issues a questionnaire for examining the above-mentioned matter (change of the electricity contract plan) to the consumer. In addition, in a case where the answer "The electricity contract plan is different from ours." was obtained from the consumer when a normal recommendation (which is not a questionnaire recommendation) was presented to the consumer, the CEMS also issues a questionnaire for examining the above-mentioned matter (change of the electricity contract plan) to the consumer. When receiving this questionnaire, the HEMS 50 of the consumer displays the questionnaire on the photo frame and/or the display of the PC.

As illustrated in FIG. 3(B), an example of the wording of this questionnaire is "Could you please tell us your current electricity contract plan (contract amperage), if it is OK with you?". In addition, this questionnaire includes answer buttons that allow the consumer to answer (notify the CEMS of) the electricity contract plan. As illustrated in FIG. 3(B), an example of display contents of the answer buttons is "10 A", "20 A", "30 A" . . . "60 A", and "Other".

Step 303: the CEMS acquires an answer to the questionnaire (operation result of the answer buttons) from the consumer. That is, when the consumer touches one of the above-mentioned answer buttons, the photo frame or the PC transmits information of the answer button to the CEMS via the HEMS 50. The CEMS acquires the transmitted information that is based on the answer button.

Step 304: the CEMS updates the dweller attribute of the consumer based on the acquired information that is based on the answer button.

<Determination of Acceptability Level Regarding Recommendation>

Step 400: the CEMS determines the acceptability level of the consumer of interest regarding the recommendation for each kind of recommendation (namely, for each agent). In this example, the acceptability level has six levels of "Level −3", "Level −2", "Level −1", "Level 0", "Level 1", and "Level 2". The acceptability level increases in the stated order. That is, "Level −3" indicates the lowest acceptability, and "Level 2" indicates the highest acceptability.

More specifically, after proceeding to Step 400, the CEMS conducts the processing of Step 401 to Step 403 described below in order, and then proceeds to Step 500.

Step 401: the CEMS acquires determination information on presence or absence of implementation, which is acquired in Step 800 described later, from the data accumulation apparatus for each agent (kind of recommendation). The determination information on the presence or absence of the implementation is information indicating whether or not the consumer has implemented an "action recommended by a given recommendation" based on the "given recommendation". As described later, the information is automatically acquired by the HEMS 40 and the CEMS.

Step 402: the CEMS acquires a "response result (response processing information) based on an operation conducted for the response button" regarding the recommendation acquired in Step 700 described later from the data accumulation apparatus for each agent (kind of recommendation). The information is acquired based on the operation conducted for the response button by the consumer described later.

Step 403: the CEMS determines the acceptability level of the consumer of interest for each agent (kind of recommendation) in accordance with the following rules based on the determination information on the presence or absence of the implementation acquired in Step 401 and the response processing information acquired in Step 402. The "acceptability level of the recommendation" means an "acceptability level regarding the agent (namely, kind of the recommendation) for issuing the recommendation". When there is no information regarding the acceptability level, the CEMS sets the acceptability level to acceptability level 0 described below.

Acceptability level 2: the determination information on the presence or absence of the implementation indicates that "the recommended action has been implemented".
Acceptability level 1: the response processing information indicates that "there is a positive answer".
Acceptability level 0: an initial value.
Acceptability level −1: the response processing information indicates that "there is a passive answer".
Acceptability level −2: there is no response to the recommendation within a time limit.
Acceptability level −3: the response processing information indicates that "there is a totally negative or disapproval answer".

Examples of the positive answer (display contents of the response button) for setting the acceptability level to "1", the passive answer for setting the acceptability level to "−1", and the totally negative or disapproval answer for setting the acceptability level to "−3" are shown in the table of FIG. 4.

<Creation of Recommendation and Determination of Issuance Priority of Recommendation>

Step 500: the CEMS creates a recommendation to be issued, and when a plurality of recommendations are created, determines which order the recommendations are to be issued (presented). More specifically, the CEMS conducts the processing of Step 501 to Step 504 described below in order, and then proceeds to Step 600.

Step 501: the CEMS determines the recommendation to be issued from among the above-mentioned plurality of recommendations. More specifically, the CEMS excludes, from the recommendation to be issued, a recommendation to be issued by an agent corresponding to the recommendation for which the above-mentioned response processing information acquired in Step 402 includes a totally negative or disapproval answer. That is, the recommendation having an acceptability level of "Level −3" is not issued.

Step 502: when there are a plurality of recommendations to be issued, the CEMS determines issuance priorities of those recommendations based on the "acceptability levels of the recommendations". That is, the CEMS determines the issuance priorities of the recommendations in such a manner that a "recommendation having a higher acceptability level" is to be issued with a higher priority. It should be noted that the CEMS may determine the issuance priorities in such a manner that a higher issuance priority is given to a recommendation exhibiting a larger energy saving effect for the consumer when the consumer implements an action corresponding to each recommendation.

Step 503: the CEMS selects a template of "recommendation wording and response buttons" based on at least "the acceptability level and the stage corresponding to the processes of AIDAS" of a recommendation of interest. Further, in some cases, the CEMS selects the template of the "recommendation wording and response buttons" based also on a "comparison result between a present value and a reference value" described later.

In this example, the CEMS determines which stage corresponding to the processes of AIDAS the current time point is in based on a length of a period from the start point of the issuance of the recommendation of interest until the current time point (length of a presentation period). More specifically, the CEMS determines that the process of AIDAS is in the first stage when the presentation period is a first length (for example, length before the lapse of one week). The CEMS determines that the process of AIDAS is in the second stage when the presentation period is a second length longer than the first length (for example, length after the lapse of one week and before the lapse of three weeks). The CEMS determines that the process of AIDAS is in the third stage when the presentation period is a third length longer than the second length (for example, length after the lapse of three weeks).

Next, the "comparison result between the value of the consumer (present value) and the reference value" is described with reference to tables shown in FIG. 5 and FIG. 6. The table of FIG. 5 relates to a "house", and the table of FIG. 6 relates to a "PHV".

The CEMS sets a reference value for each of some recommendations (in this example, (A-1) "power saving recommendation/comparison within the area" recommendation shown in FIG. 5) based on "the above-mentioned dweller attribute updated in Step 304", and compares the present value with the reference value. In addition, the CEMS sets reference values shown in the tables of FIG. 5 and FIG. 6 for other recommendations ((A-2), (B-1), (B-2), (C-1), and (D-1)). Then, the CEMS determines for each recommendation whether or not the present value is larger than the reference value (equal to or larger than the reference value) or smaller than the reference value (less than the reference value). The determination result corresponds to the "comparison result between the value of the consumer (present value) and the reference value".

For example, in regard to the (A-1) recommendation shown at the top row of the table of FIG. 5, an average value of variable unit price electricity rates (corresponding to one week or one month) of consumers having the same household size (dweller attribute) as the household size of the consumer of interest is obtained as the reference value. Then, a variable unit price electricity rate (value of the consumer or the present value) of the consumer of interest is compared with the obtained reference value (average value), to thereby acquire the above-mentioned "comparison result between the value of the consumer and the reference value".

Figure 7:
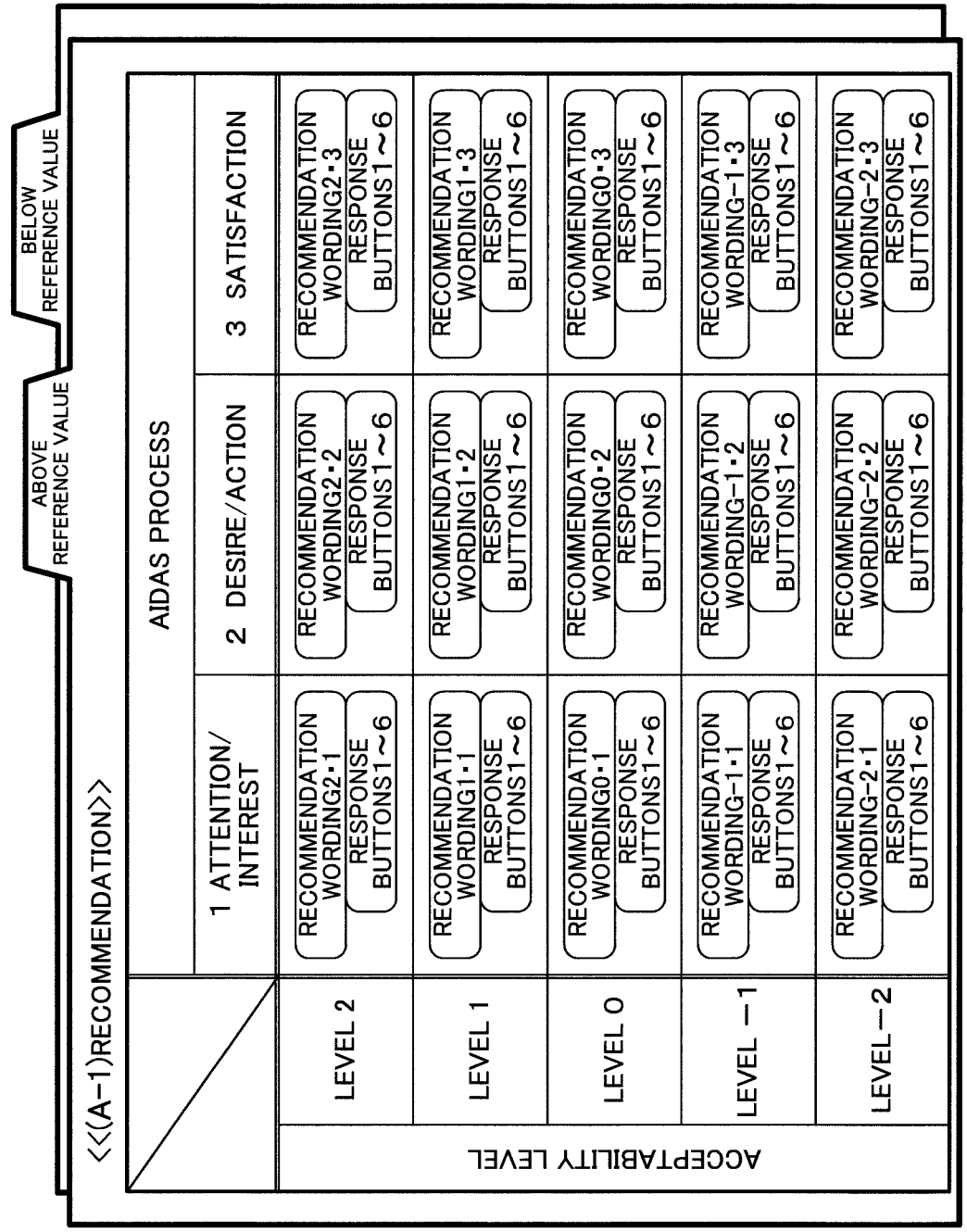
FIG. 7 is a diagram for illustrating an example of a look-up table to be referred to when the CEMS illustrated in FIG. 1 selects a template of "recommendation wording and response buttons".

Thereafter, the CEMS selects the template of the "recommendation wording and response buttons" by applying at least the acceptability level of the recommendation of interest, the "AIDAS process stage", and further the "comparison result between the present value and the reference value" as necessary to a look-up table illustrated in, for example, FIG. 7. The example shown in FIG. 7 is a look-up table for selecting a template of the wording of the (A-1) "power saving recommendation/comparison within the area" recommendation, which is issued by the (A) electricity cost saving agent. An arbitrary number of (six at the maximum in this example) response buttons are provided in advance for each template of the recommendation. Examples of the template selected in this manner are illustrated in FIG. 8 to FIG. 10. In those diagrams, reference symbol M10 indicates the template of the wording of the recommendation, and reference symbol B10 indicates the template of the response buttons. A given number of templates of the "recommendation wording and response buttons" are provided, the given number corresponding to, for example, the number of reference values shown in the table of FIG. 5.

The template of the wording of some recommendations may be determined without using the "comparison result between the present value and the reference value". In this case, the CEMS selects the recommendation based on only "the acceptability level and the AIDAS process stage" of the recommendation of interest.

Further, for some of the recommendations, two or more kinds of "comparison results between the present value and the reference value" through use of two or more reference values may be combined. The above-mentioned recommendation may be selected based on the above-mentioned combination as well as the acceptability level and the AIDAS process stage of the recommendation of interest.

Step 504: the CEMS embeds necessary data into the template of the wording of the selected recommendation, to thereby create a final recommendation. That is, the CEMS embeds the above-mentioned specific numerical values acquired in Step 200 and the like into "X", "Y" and "Z" within the wording of the template of each of the recommendations illustrated in, for example, FIG. 8 and FIG. 9, to thereby create the final recommendation.

<Displaying of Recommendation>

Step 600: the CEMS displays the created recommendation on the photo frame and/or the PC via the HEMS 50 in accordance with a display schedule defined in advance. When a plurality of recommendations exist simultaneously, the CEMS displays the recommendations in order according to the above-mentioned issuance priorities determined in Step 502.

<Processing of Response to Recommendation>

Step 700: the CEMS acquires the "response result based on the operation conducted for the response button", and stores the acquired response result in the data accumulation apparatus in association with the recommendation. At this time, the CEMS monitors whether or not the "response result based on the operation conducted for the response button" is obtained within a fixed time period (time limit) after the recommendation starts being displayed. When the "response result based on the operation conducted for the response button" fails to be obtained within the fixed time period, the CEMS stores the above-mentioned fact in the data accumulation apparatus in association with the recommendation. In this case, as described above, the acceptability level is set to "−1". The stored information is used for the subsequent processing of Step 402 described above in the next cycle.

<Determination of Presence or Absence of Implementation Regarding Recommendation>

Step 800: in the same manner as in Step 200 described above, the CEMS acquires the track record data, and analyzes the track record data to determine whether or not implementation regarding the recommendation has been conducted. For example, when a decrease amount of the power consumption amount becomes equal to or larger than a "threshold value that is changeable by a system administrator" within a predetermined period from a time point at which the (A-1) "power saving recommendation/comparison within the area" recommendation was firstly displayed, the CEMS determines that the implementation regarding the recommendation has been conducted, and stores the above-mentioned fact in the data accumulation apparatus. In another case, for example, when an increasing rate of the EV traveling ratio becomes equal to or larger than a "threshold value that is changeable by the system administrator" within a predetermined period from a time point at which the (C-1) "how to use the PHV" recommendation started being displayed, the CEMS determines that the implementation regarding the recommendation has been conducted, and stores the above-mentioned fact in the data accumulation apparatus.

<Displaying of Effect>

Step 900: the CEMS processes the track record data acquired in Step 200, and displays transitions of those pieces of track record data by graph or the like.

Figure 2:
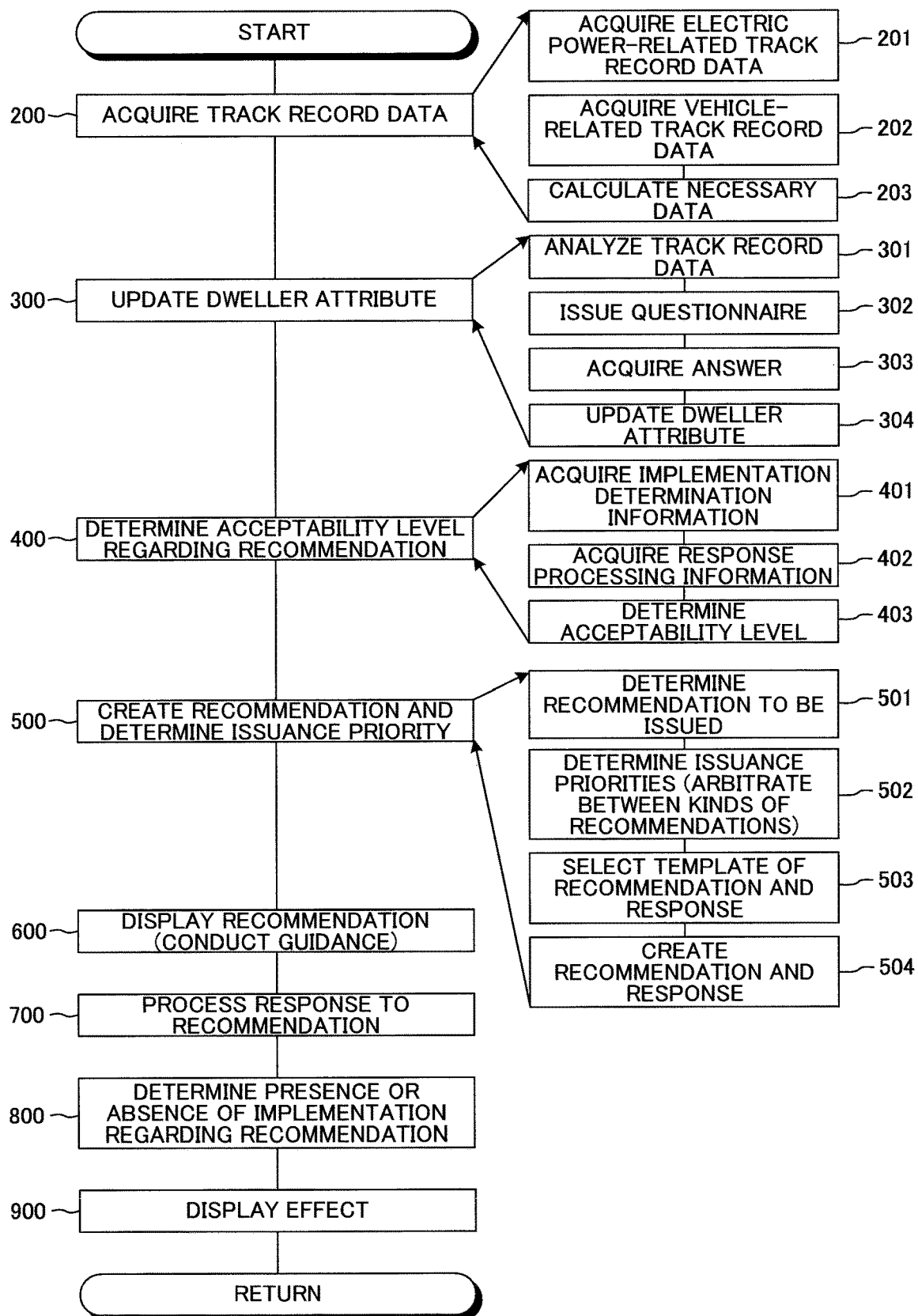
FIG. 2 is a flowchart for illustrating a routine executed by a CEMS illustrated in FIG. 1.

As described above, this system 10 includes:

an information terminal (for example, a photo frame and/or a display of a PC being the information terminals 44) configured to provide a consumer, who has/possesses an electric load (see, for example, 43, 45) to which electric energy is supplied from an electric power supply system (20) within a residence including a "house (40) and land accompanying the house (40)", with energy consumption-related information (recommendation) relating to energy consumption caused by the consumer; and an information providing apparatus (see, for example, 30 and 50 and Step 600 of FIG. 2) including a data accumulation apparatus and a computer and being configured to transmit the energy consumption-related information to the information terminal so as to present the energy consumption-related information on the information terminal, in which:

the information terminal is configured to be capable of transmitting information corresponding to an operation for a button in the information terminal to the information providing apparatus; and the information providing apparatus is configured to determine an acceptability level, which stepwise indicates a degree of interest of the consumer in the energy consumption-related information, based on at least a content of the operation of the button by the consumer when the energy consumption-related information is presented to the consumer through the information terminal (see, for example, Step 400, Step 402, Step 403, and Step 700 of FIG. 2), and to determine the energy consumption-related information to be newly provided to the consumer based on the determined acceptability level (see, for example, Step 500 of FIG. 2).

Further, the information providing apparatus is configured to determine based on track record data relating to the energy consumption of the consumer whether or not the consumer has implemented an action that is based on the energy consumption-related information after presenting the energy consumption-related information to the consumer, and to change the acceptability level based on a result of the determination (see, for example, Step 400, Step 401, Step 403, and Step 800 of FIG. 2).

Further, the information providing apparatus is configured to determine the energy consumption-related information to be presented to the consumer based also on information indicating a dweller attribute being a property of the consumer, which exerts an influence on the energy consumption of the consumer (see, for example, Step 500 and Step 503 of FIG. 2 and the (A-1) recommendation of FIG. 5).

Further, the information providing apparatus is configured to transmit information (for example, FIG. 3) including a questionnaire for inquiring about the dweller attribute to the information terminal, to present the information including the questionnaire on the information terminal, to acquire an answer to the questionnaire based on the information corresponding to the button operation conducted by the consumer, and to update the information indicating the dweller attribute based on the acquired answer (see, for example, Step 300 and Step 302 to Step 304 of FIG. 2).

Further, the information providing apparatus is configured to determine based on track record data relating to the energy consumption of the consumer whether or not it is highly probable that the dweller attribute has changed (see, for example, Step 301 of FIG. 2), to transmit the information including the questionnaire to the information terminal when determining that it is highly probable that the dweller attribute has changed, and to present the information including the questionnaire on the information terminal (see, for example, Step 302 of FIG. 2).

Further, the information providing apparatus is configured to determine a stage corresponding to processes of an AIDAS formula based on a length of a period after the energy consumption-related information starts being presented, and to change wording of the energy consumption-related information to be presented to the consumer based on the determined stage (see, for example, Step 503 of FIG. 2 and FIG. 7).

In this manner, the recommendation presented by this system 10 is changed based on the acceptability level of the consumer regarding the recommendation, the dweller attribute of the individual consumer, the AIDAS process stage of the individual consumer regarding the recommendation, and the like. Therefore, the recommendation presented to the consumer becomes a recommendation that is easy to be accepted by the consumer and meaningful to the consumer. As a result, this system 10 can increase effectiveness of energy saving, energy cost reduction, and the like.

The present invention is not limited to the above-mentioned embodiment, and various modification examples can be employed within the scope of the present invention. For example, this system 10 may be configured to select the template of the wording of the recommendation based only on the acceptability level of the consumer. Further, this system 10 may be configured to select the template of the wording of the recommendation based only on the acceptability level and the dweller attribute of the consumer.

Further, this system 10 is configured to inhibit the issuance of the recommendation involving a totally negative or disapproval answer within the response processing information (recommendation having the acceptability level of "Level −3"), but may be configured to present the same recommendation again by forcedly changing the acceptability level to "Level 0" (initializing the acceptability level) when a period of the acceptability level being "Level −3" becomes equal to or longer than a fixed period (for example, one month).

Further, this system 10 may be configured to exclude (C-1) the "how to use the PHV" recommendation from the recommendation to be issued in Step 501 when, for example, the EV traveling ratio is already extremely high even with the acceptability level of the consumer regarding the recommendation being "Level 2".

Further, this system 10 may be configured to present "messages having effectiveness common to general consumers (for example, request for power peak shift and recommended driving spots)" relating to energy consumption in addition to the above-mentioned recommendation.

The invention claimed is:

1. A system, comprising:
a data terminal configured to:
receive electrical power data from a sensor;
display energy consumption-related data received over a network; and
display a plurality of buttons, and detect user input to select one of the plurality of buttons; and
a data providing apparatus connected to the data terminal over the network and configured to receive the electrical power data from the data from the data terminal, generate the energy consumption-related data based on the electrical power data, and transmit the energy consumption-related data to the data terminal over the network, wherein,
the energy consumption-related data includes a suggestion about an action for energy saving;
the user input to select the one of the plurality of buttons causes the data terminal to generate response data regarding the displayed energy consumption-related data that includes the suggestion;
the data terminal transmits the response data and the electrical power data to the data providing apparatus over the network; and
the data providing apparatus:
determines an acceptability level, which indicates a degree of interest in the suggestion included in the energy consumption-related data, based on the response data generated by the user input to the one of the plurality of buttons,
generates new energy consumption-related data that includes a new suggestion about an action for energy saving, based on the electrical power data and the determined acceptability level, by selecting a template of wording for the new suggestion about the action, and
transmits the new energy consumption-related data to the data terminal over the network, and
the data terminal is further configured to display the new energy consumption-related data and the new suggestion about the action for energy saving, in response to detecting the user input to select the one of the plurality of buttons.

2. The system according to claim 1, wherein the data providing apparatus is configured to determine, based on the electrical power data, whether or not the consumer has implemented an action that is based on the energy consumption-related data, and to change said acceptability level based on a result of the determination.

3. The system according to claim 1, wherein the data providing apparatus is configured to determine the energy consumption-related data based also on data indicating a dweller attribute being a property of the consumer.

4. The system according to claim 3, wherein the data providing apparatus is configured to transmit data including a questionnaire for inquiring about the dweller attribute to the data terminal, to acquire an answer to the questionnaire based on a content of the user input at the data terminal, and to update the data indicating the dweller attribute based on the acquired answer.

5. The system according to claim 4, wherein the data providing apparatus is configured to determine, based on the electrical power data, whether or not the dweller attribute has changed, and to transmit the data including the questionnaire when determining that the dweller attribute has changed.

6. The system according to claim 1, wherein the data providing apparatus is configured to determine a stage corresponding to processes of an AIDAS formula based on a length of a period after the energy consumption-related data starts being presented, and to change wording of the energy consumption-related data to be transmitted to the data terminal based on the determined stage.

7. A method for providing energy consumption-related data through a data terminal to a consumer, comprising:
controlling the data terminal to receive electrical power data from a sensor;
with a data providing apparatus, receiving the electrical power data from the data terminal, generating the energy consumption-related data based on the electrical power data, and transmitting, from the data providing apparatus and over a network, the energy consumption-related data to the data terminal, the energy consumption-related data including a suggestion about an action for energy saving;
displaying a plurality of buttons on the data terminal, and detecting user input to select one of the plurality of buttons, the user input to select the one of the plurality of buttons causing the data terminal to generate response data regarding the energy consumption-related data that includes the suggestion;
transmitting the response data and the electrical power data to the data providing apparatus over the network;
determining, with the data providing apparatus, an acceptability level, which indicates a degree of interest in the suggestion included in the energy consumption-related data, based on the response data generated by the user input to the one of the plurality of buttons;
generating new energy consumption-related data that includes a new suggestion about an action for energy saving, based on the electrical power data and the determined acceptability level by selecting a template of wording for the new suggestion about the action; and
transmitting the new energy consumption-related data to the data terminal over the network; and
controlling the data terminal to display the new energy consumption-related data and the new suggestion about the action for energy saving, in response to detecting the user input to select the one of the plurality of buttons.

8. The method according to claim 7, wherein the determining the acceptability level comprises:
determining, based on the electrical power data, whether or not the consumer has implemented an action that is based on the energy consumption-related data; and
changing the acceptability level based on a result of the determination.

9. The method according to claim 7, wherein the generating the new energy consumption-related data comprises determining the new energy consumption-related data based on data indicating a dweller attribute being a property of the consumer.

10. The method according to claim 9, wherein the generating the new energy consumption-related data comprises:
transmitting data including a questionnaire for inquiring about the dweller attribute to the data terminal;
acquiring an answer to the questionnaire based on a content of the user input at the data terminal; and
updating the data indicating the dweller attribute based on the acquired answer.

11. The method according to claim 10, wherein the transmitting the data including the questionnaire comprises:
determining, based on the electrical power data, whether or not the dweller attribute has changed; and
transmitting the data including the questionnaire when determining that the dweller attribute has changed.

12. The method according to claim 7, wherein the generating the new energy consumption-related data comprises:
determining a stage corresponding to processes of an AIDAS formula based on a length of a period after the energy consumption-related data starts being presented; and
changing wording of the energy consumption-related data to be transmitted to the data terminal based on the determined stage.

13. A non-transitory computer readable medium storing a program, for providing energy consumption-related data through a data terminal to a consumer, to cause a computer to execute processes of:
controlling the data terminal to receive electrical power data from a sensor;
with a data providing apparatus, receiving the electrical power data from the data terminal, generating the energy consumption-related data based on the electrical power data, and transmitting, from the data providing apparatus and over a network, the energy consumption-related data to the data terminal, the energy consumption-related data including a suggestion about an action for energy saving;
displaying a plurality of buttons on the data terminal, and detecting user input to select one of the plurality of buttons, the user input to select the one of the plurality of buttons causing the data terminal to generate response data regarding the energy consumption-related data that includes the suggestion;
transmitting the response data and the electrical power data to the data providing apparatus over the network;
determining, with the data providing apparatus, an acceptability level, which indicates a degree of interest in the suggestion included in the energy consumption-related data, based on the response data generated by the user input to the one of the plurality of buttons;
generating new energy consumption-related data that includes a new suggestion about an action for energy saving, based on the electrical power data and the determined acceptability level by selecting a template of wording for the new suggestion about the action; and
transmitting the new energy consumption-related data to the data terminal over the network; and
controlling the data terminal to display the new energy consumption-related data and the new suggestion about the action for energy saving, in response to detecting the user input to select the one of the plurality of buttons.

14. The computer readable medium according to claim 13, wherein the program causes the computer to execute processes of:
determining, based on the electrical power data, whether or not the consumer has implemented an action that is based on the energy consumption-related data; and
changing the acceptability level based on a result of the determination.

15. The computer readable medium according to claim 13, wherein the program causes the computer to execute processes of:
generating the new energy consumption-related data based on data indicating a dweller attribute being a property of the consumer.

16. The computer readable medium according to claim 15, wherein the program causes the computer to execute processes of:
- transmitting data including a questionnaire for inquiring about the dweller attribute to the data terminal;
- acquiring an answer to the questionnaire based on a content of the user input at the data terminal; and
- updating the data indicating the dweller attribute based on the acquired answer.

17. The computer readable medium according to claim 16, wherein the program causes the computer to execute processes of:
- determining, based on the electrical power data, whether or not the dweller attribute has changed; and
- transmitting the data including the questionnaire when determining that the dweller attribute has changed.

18. The computer readable medium according to claim 13, wherein the program causes the computer to execute processes of:
- determining a stage corresponding to processes of an AIDAS formula based on a length of a period after the energy consumption-related data starts being presented; and
- changing wording of the energy consumption-related data to be transmitted to the data terminal based on the determined stage.

* * * * *